Feb. 24, 1931.  G. T. PFLEGER  1,794,029
COOLING MEANS FOR MOTORS
Filed Dec. 27, 1927

INVENTOR
George T. Pfleger,
BY
ATTORNEY.

Patented Feb. 24, 1931

1,794,029

UNITED STATES PATENT OFFICE

GEORGE T. PFLEGER, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA

COOLING MEANS FOR MOTORS

Application filed December 27, 1927. Serial No. 242,792.

My invention relates to dynamo electric machines having provisions for the dissipation of the heat generated therein.

The high current induced in the conductors, hysteresis, and the electrical resistance of the windings cause much heat to be generated in the operation of a dynamo electric machine. This heat must be continuously dissipated in order to protect the insulation of the machine.

It is an object of my invention to provide a dynamo electric machine having a means for dissipating this heat by the circulation of cooling air around the stator.

It is a further object of my invention to provide in a dynamo electric machine a large cooling area by providing rings among the stator punchings, these rings having projections extending beyond the outer periphery of the stator.

It is another object of my invention to provide a dynamo electric machine having a very effective cooling area by forming the rings and projections, described above, of a material of high heat conductivity.

It is still another object of my invention to provide in a dynamo electric machine a very effective cooling area by arranging the projections described above to form tortuous air passages around the stator.

Further objects and advantages will be made obvious in the following description which may be better understood with reference to the accompanying drawings in which.

Figure 1:
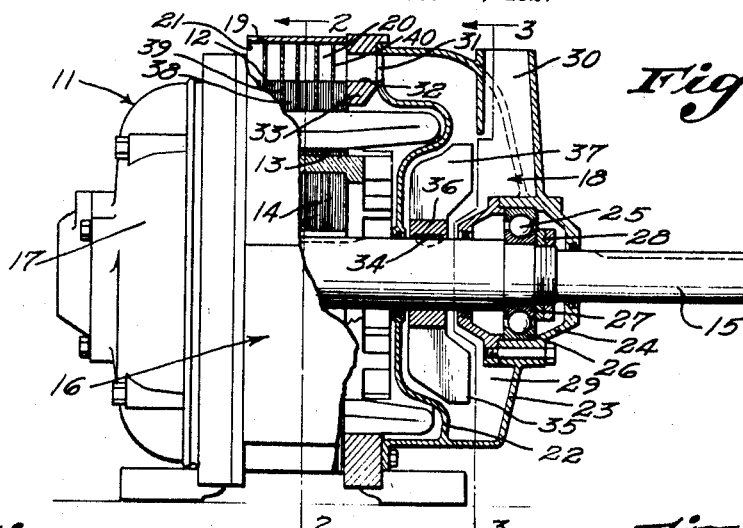
Fig. 1 is a side elevation, partially in section, showing a motor embodying one form of my invention.
Figure 2:
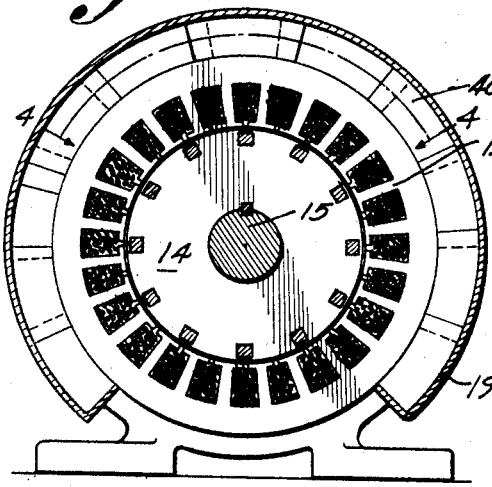
Fig. 2 is a section taken on the line 2—2 of Fig. 1.

Referring to the drawings and particularly to Fig. 1, the numeral 11 represents a motor comprising a stator 12 with a cylindrical bore 13, a rotor 14 non-rotatably mounted on a shaft 15 in the bore 13, and a motor shell 16 surrounding the stator 12 and the rotor 14, this shell comprising end housings 17 and 18 and a stator cage 19 adapted to form around the stator 12 a passage 20 open at one end 21.

The end housing 17 is of the conventional type supporting the shaft 15 in the usual manner. The end housing 18 includes an inner plate 22 and an end plate 23. The end plate 23 supports a bearing box 24 in which a bearing 25 is mounted so that its outer race 26 engages the inner surface of the bearing box 24, and its inner race 27 is retained in non-rotatable engagement with the shaft 15 by lock nuts 28.

Figure 3:
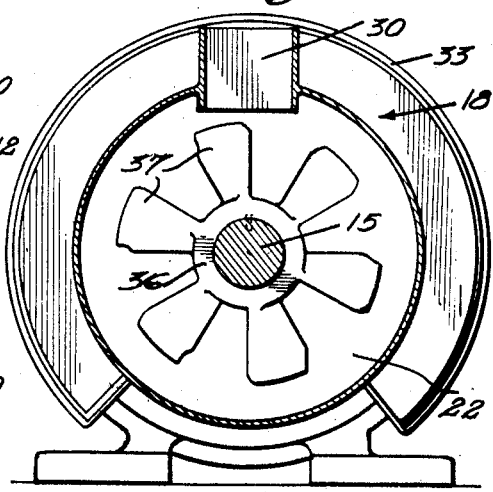
Fig. 3 is a view indicated by the line 3—3 of Fig. 1.

Formed between the end plate 23 and the inner plate 22 is a chamber 29 sealed from the rotor 14 by the inner plate 22 and communicating with the atmosphere through a spout 30. The chamber 29 communicates also with the passage 20 through openings 31 in the inner plate 22 and openings 32 in the end plates 33 of the stator 12. Non-rotatably mounted in the chamber 29 on the shaft 15, as by a key 34, is a fan 35 comprising a hub 36 and blades 37 as best shown in Fig. 3.

Figure 4:
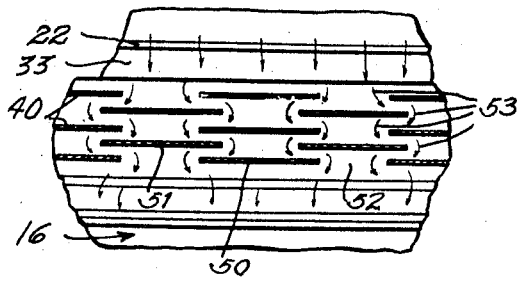
Fig. 4 is a view indicated by the line 4—4 of Fig. 2.

Among the conventional punchings 38 of the stator 12 are rings 39 preferably made of a material of high heat conductivity with projections or baffles 40 extending beyond the outer periphery of the stator 12 into the passage 20, the outer edges of the projections 40 engaging against the inner surface of the stator cage 19, so that the passage 20 is sealed at its upper and lower sides. The projections 40 are disposed in two series 50 and 51 of similarly disposed rows extending axially of the motor, one series 50 of rows being spaced to form channels 52 along the surface of the stator 12 and the other series 51 of rows being disposed across the channels 52, thus staggering the projections 40 of adjacent rings 39 to force the air passing through the passage 20 to travel a tortuous or ogee path, as indicated by the arrows 41 of Fig. 4, the general direction of the ogee path being perpendicular to the plane of the projections 40 or axial to the motor 11.

The operation of my invention is as follows:

The shaft 15 being rotated by a means, not shown, the fan 35 is caused to rotate, drawing air through the spout 30 into the chamber 29. From the chamber 29 the air is forced by the fan 35 through the openings 31 and 32 into the passage 20 around the stator 12. By the arrangement of the projections 40 in the passage 20 the air is compelled to circulate in a tortuous or ogee path in which it effectually contacts the whole area of the projections 40. The projections or baffles 40 also set up a turbulence in the air traveling through the passage 20. This turbulence causes almost all the air traveling through the passage to contact the radiating surfaces instead of permitting only a thin envelope adjacent the projections 40 to make such a contact. I have found that this turbulence increases the cooling action of the air many fold. After the air has circulated past the projections 40, it is returned to the atmosphere through the open end 21 of the passage 20.

I claim as my invention:

1. In a rotating electric machine, the combination of: a stator comprising a plurality of punchings; a cage forming a passage around said stator; plates of a material of high heat conductivity disposed between said punchings and having projections thereon extending through said passage and engaging the inner surface of said cage; and means for circulating a cooling medium through said passage and around said projections.

2. In combination: a magnetic body formed of a plurality of laminations; a series of primary plates formed from a material of high heat conductivity and disposed in spaced relationship between pairs of laminations, said plates providing projections extending beyond the surface of said magnetic body, said projections being in alignment to provide a channel extending along the surface of said magnetic body; a series of secondary plates formed from a material of high heat conductivity and being disposed between pairs of laminations and in spaced relationship to said primary plates, said secondary plates providing projections extending across said channel in a manner to form ogee passages; and means for circulating a cooling medium through said ogee passages.

3. In a rotating electric machine, the combination of: a stator comprising a plurality of punchings; a cage forming a passage around said stator; plates of a material of high heat conductivity disposed between said punchings and having projections thereon extending through said passage to said cage and forming a plurality of tortuous passages around said stator; and means for circulating a cooling medium through said passages.

4. In a rotating electric machine, the combination of: a stator comprising a plurality of punchings; means for forming a passage around said stator; plates of a material of high heat conductivity disposed between said punchings and having projections thereon extending into said passage in staggered relationship to form a plurality of ogee passages extending in a general direction perpendicular to the plane of said projections; and means for circulating a cooling medium through said ogee passages.

5. In a rotating electric machine, the combination of: a stator comprising a plurality of punchings extending transversely of said machine; means for forming a passage around said stator; plates of a material of high heat conductivity disposed between said punchings and having projections thereon extending into said passage in staggered relationship to form a plurality of ogee passages extending axially of said machine; and means for circulating a cooling medium through said ogee passages.

In testimony whereof, I have hereunto set my hand at Los Angeles, California, this 19th day of December, 1927.

GEORGE T. PFLEGER.